United States Patent [19]
Gregory

[11] Patent Number: 6,032,840
[45] Date of Patent: Mar. 7, 2000

[54] VEHICLE ARMREST/CONSOLE VALET

[76] Inventor: Frederick C. Gregory, 43264 Camino Curuna, Temecula, Calif. 92592

[21] Appl. No.: 09/159,981

[22] Filed: Sep. 24, 1998

[51] Int. Cl.[7] .................................................... B60R 7/00
[52] U.S. Cl. ...................... 224/275; 220/23.86; 220/694; 224/42.11; 224/277
[58] Field of Search .................................. 224/275, 277, 224/278, 42.11, 539, 148.3, 148.4; 297/227, 228; 312/235.6; 150/165, 158, 159; 206/373; 296/37.8, 37.1; 220/23.86

[56] References Cited

U.S. PATENT DOCUMENTS

| | | | |
|---|---|---|---|
| 2,467,471 | 4/1949 | Goldstein | 150/165 |
| 3,804,233 | 4/1974 | Gregg, Jr. | 224/42.32 |
| 4,106,829 | 8/1978 | Dolle et al. | |
| 4,756,455 | 7/1988 | Kitner et al. | 224/42.11 |
| 5,150,946 | 9/1992 | Marfilius et al. | |
| 5,516,191 | 5/1996 | McKee . | |
| 5,740,951 | 4/1998 | Jack | 224/148.3 |
| 5,772,066 | 6/1998 | Reynolds | 220/694 |
| 5,797,528 | 8/1998 | McDuffie | 224/148.4 |

Primary Examiner—Gregory M. Vidovich
Assistant Examiner—Maerena Brevard
Attorney, Agent, or Firm—Loyal McKinley Hanson

[57] ABSTRACT

An accessory for an automobile having an armrest structure or console intermediate the driver seat and the passenger seat includes a device adapted to cover the armrest structure. It is fabricated from cloth, leather, synthetic leather or other suitably pliable material. A top portion of the device rests atop the armrest structure while a side or skirt portion extends downwardly from the top portion alongside the armrest structure. One or more upwardly opening pocket arrangements on the side portion hold personal items (e.g., a beverage container, a pair of eye glasses, a mobile telephone, a pencil, a pen, a tape recorder, a calculator, a camera, a wallet). One forwardly opening pocket arrangement on the top portion holds a pad of paper and another holds business cards. The top portion of one embodiment includes a first leaf adapted to hold a laptop computer, a second leaf adapted to hold the pad of paper, and a third leaf that covers the pad of paper. An insulated auxiliary or companion box may be included to hold the accessory intermediate backseat passengers as a dummy armrest structure that also serves as a cooler.

7 Claims, 2 Drawing Sheets

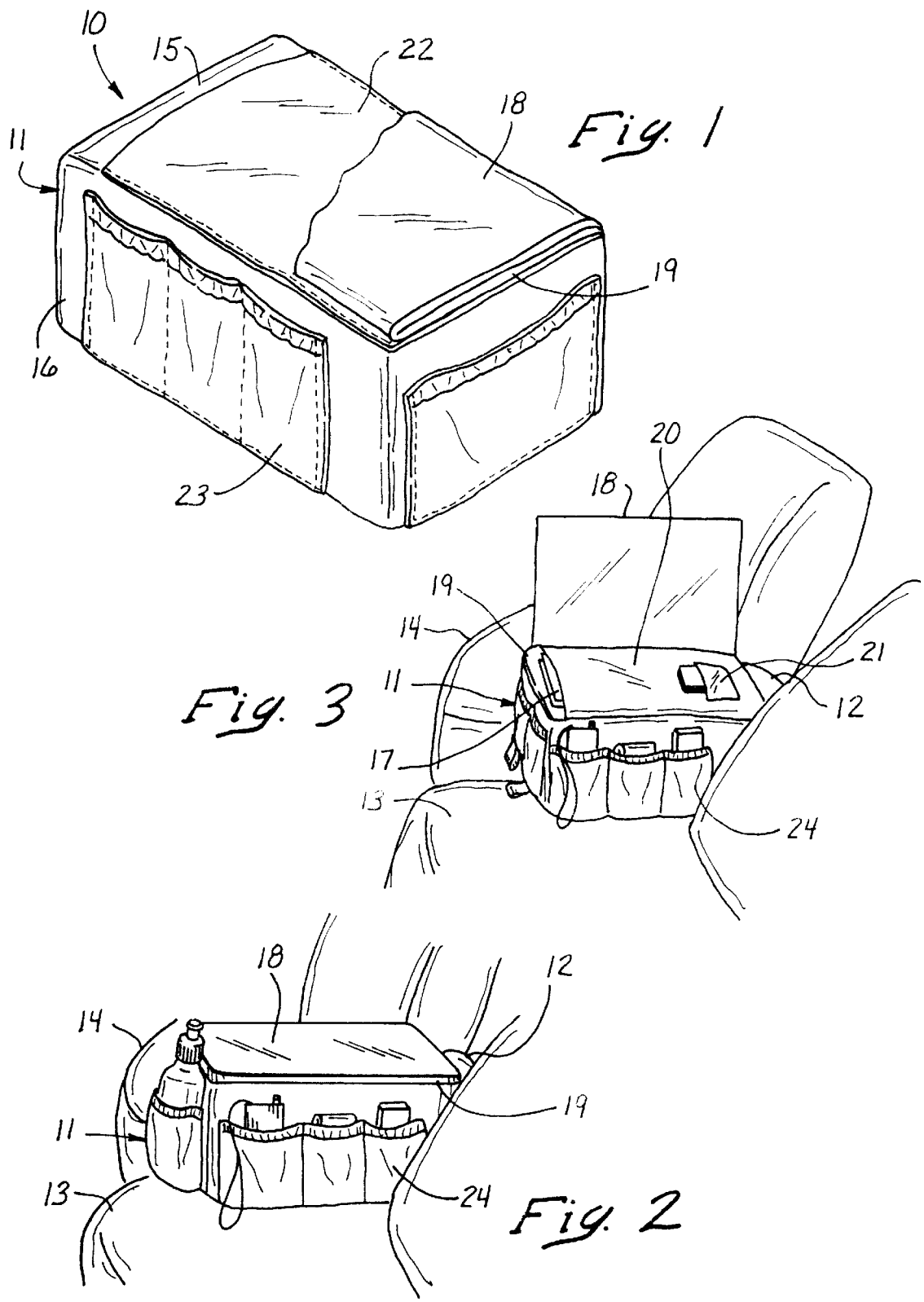

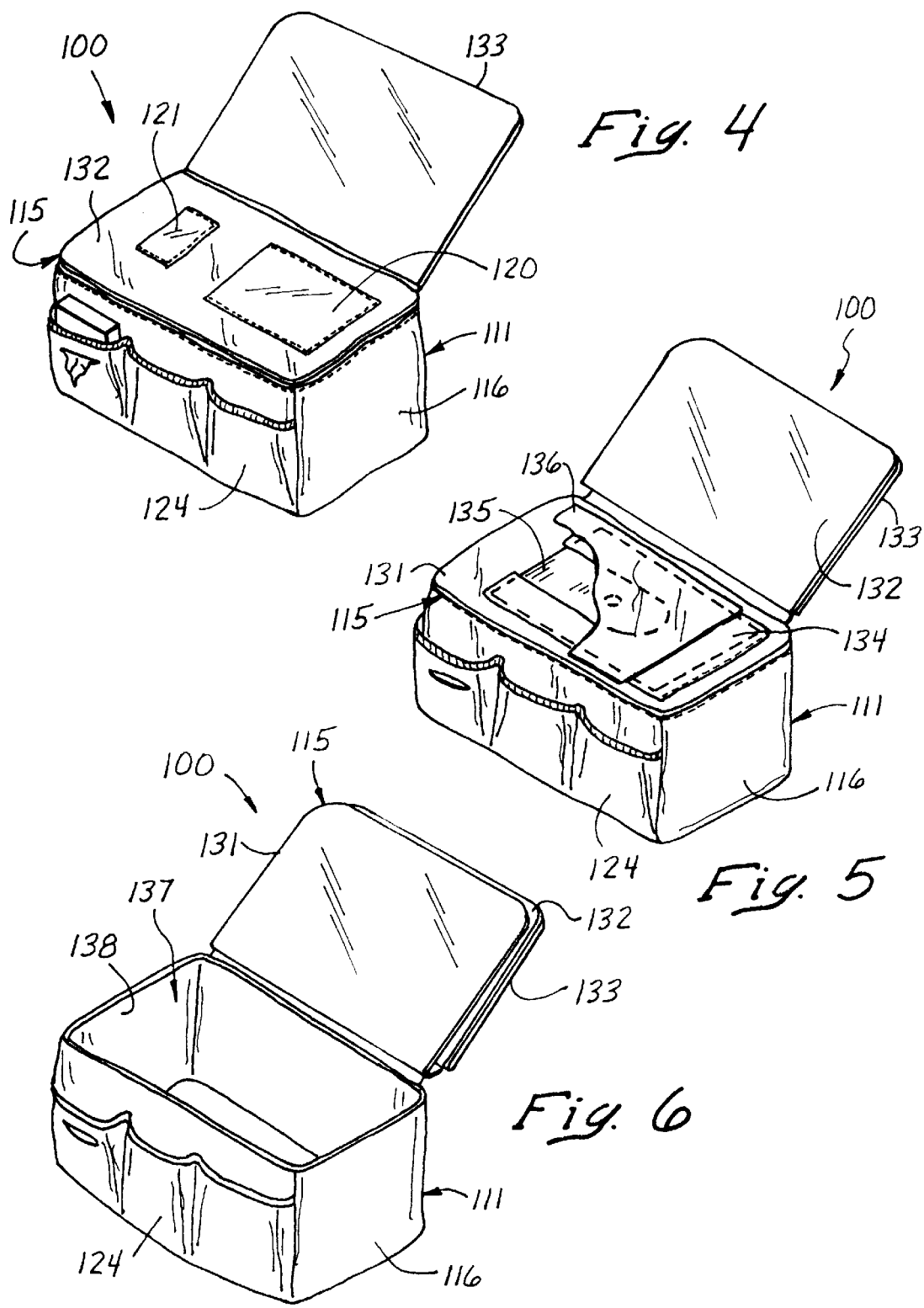

6,032,840

VEHICLE ARMREST/CONSOLE VALET

BACKGROUND OF THE INVENTION

1. Technical Field

This invention relates generally to automotive accessories, and more particularly to an accessory adapted to hold various personal items in a convenient manner within a vehicle so that they are readily accessible by the driver.

2. Description of Related Art

The vehicle armrests and vehicle consoles of interest herein are structures located intermediate the left and right front seats of an automobile for passenger comfort, convenience, and safety. Some include a beverage container holder. Others are outfitted with a change holder, cassette holder, storage compartment, and so forth.

Although they can be somewhat handy, existing armrest and console structures can also be somewhat complicated, expensive, and limited in functionality. Thus, a need exists for improved accessories of this type. Vehicle manufacturers and owners seek better designs and some way to conveniently and inexpensively retrofit existing vehicles.

SUMMARY OF THE INVENTION

This invention addresses the concerns outlined above by providing an after-market vehicle accessory that fits over and covers an existing vehicle armrest or console. At least partially fabricated from cloth, leather, synthetic leather, or other suitably pliable material, the accessory includes a top portion that rest atop the armrest and holds a pad of paper, and a side portion that extends downwardly alongside the armrest where it provides one or more pockets for articles, including, for example, a beverage container, pair of eye glasses, mobile telephone, pencil, pen, tape recorder, calculator, camera, wallet, and so forth. One embodiment includes a holder for a laptop computer. Thus, the accessory of this invention inexpensively and conveniently converts the existing armrest structure to the multifunction use desired, and an auxiliary box may be used to support the valet intermediate backseat passengers as a dummy armrest structure that also serves as a cooler.

To paraphrase some of the more precise claim language that is subsequently presented, a vehicle accessory constructed according to the invention includes a device having a size and shape adapted to rest atop and cover the armrest structure. A top portion of the device has a size and shape adapted to rest atop the armrest structure and hold a pad of paper. A side portion of the device has a size and shape adapted to extend downwardly from the top portion alongside the armrest structure. At least one upwardly opening pocket arrangement is provided on the side portion for holding an article.

The top portion of one embodiment includes a first leaf adapted to hold a laptop computer, a second leaf adapted to hold the pad of paper, and a third leaf that covers the pad of paper. An insulated auxiliary box holds the accessory intermediate backseat passengers as a dummy armrest structure that also serves as a cooler. The following illustrative drawings and detailed description make the foregoing and other objects, features, and advantages of the invention more apparent.

BRIEF DESCRIPTION OF THE DRAWINGS

FIG. 1 of the drawings is an isometric top, front, and left side view of a vehicle accessory or "valet" constructed according to the invention, with portions broken away to expose the reinforcing panel in the top;

FIG. 2 is a reduced isometric view showing the valet installed over an existing automobile armrest structure;

FIG. 3 is an isometric view similar to FIG. 2 in which the upper leaf is open to expose the pad holder;

FIG. 4 is an isometric view of a second embodiment of a valet constructed according to the invention that fits on the armrest structure but is illustrated on an auxiliary box for use intermediate the left and right backseat positions;

FIG. 5 is an isometric view of the second embodiment with the pad holder second leaf raised to expose a laptop computer tray on the first leaf; and FIG. 6 is an isometric view of the second embodiment with the laptop computer holder first leaf raised to expose the interior of the auxiliary box on which the second embodiment is installed.

DESCRIPTION OF THE PREFERRED EMBODIMENTS

First considering first FIGS. 1–3. They show an accessory 10 constructed according to the invention. The accessory 10 includes a device 11 having a size and shape adapted to rest upon and cover an automobile armrest structure 12 that is disposed intermediate a driver seat 13 and a passenger seat 14 of the automobile. The armrest structure 12 may take any of various known forms, including a single armrest structure that opens to expose a storage compartment within it, for example, or the side-by-side combination of individual driver seat and passenger seat armrests. It typically measures about eighteen to twenty inches long, six to ten inches wide, and eight to ten inches high, although those dimensions may vary without departing from the inventive concepts disclosed. The device 11 is sized and shape accordingly so that it fits over the armrest structure 12 to rest upon the armrest structure 12.

The device 11 includes a top portion 15 and a side portion 16 (FIG. 1). The top portion 15 has a size and shape adapted to rest atop the armrest structure 12, as depicted in FIGS. 2 and 3, and to hold a pad of paper 17 (FIG. 3). The illustrated top portion 15 is rectangularly shaped, measuring about twelve inches long by about eight inches wide. It is configured something like a conventional pad holder available from a stationery store. An upper leaf 18 closes like the cover of a book over a lower leaf 19. The lower leaf 19 includes a forwardly opening pocket arrangement 20 in which the pad of paper 17 is placed. Typically, just a cardboard back of the pad of paper 17 is inserted into the pocket arrangement 20 (instead of the whole pad) so that the sheets of paper overlap the pocket arrangement 20 in an exposed position where they can be written upon. Another forwardly opening pocket arrangement 21 (FIG. 3) holds business cards. A padded reinforcing panel 22 within the upper leaf 18 adds some rigidity.

The side portion 16 of the device 11 has a size and shape adapted to extend downwardly from the top portion 15 alongside the armrest structure 12. The illustrated side portion 16 measures about seven inches high, and it encircles the armrest structure 12. At least one upwardly opening pocket arrangement 23 is provided on the side portion 16 for holding articles. The pocket arrangement 23 is illustrated in a position that faces the passenger seat 14. Preferably, additional pockets are provided, such as a pocket arrangement 24 facing the driver seat, and additional pockets facing forwardly and rearwardly may be included.

To use the accessory 10, the user simply installs it over the armrest structure 12, usually with the pad of paper 17 already inserted into the pocket arrangement 20. Then, the user places one or more articles in the pockets on the side portion 16. As a further idea of construction, the device 11 is fabricated from pieces of heavy cloth or canvas (e.g., automotive upholstery material) that are sewn together into the illustrated configuration. Elastic bands may be sewn into the pockets.

Now consider FIGS. 4–6. They show a second embodiment of the invention fabricated from pieces of synthetic leather automotive upholstery material that are sewn into the illustrated configuration. It is designated as an accessory 100. It is similar in many respects to the accessory 10 and so only differences are described in further detail. For convenience, some reference numerals designating parts of the accessory 100 are increased by one hundred over those designating related parts of the accessory 10.

One difference is that the accessory 100 includes three leafs 131, 132, and 133 instead of just two leafs. The lower or first leaf 131 (FIG. 5) includes a forwardly opening pocket arrangement 134 that is adapted to receive a lower tray component 135 (e.g., a rigid plate of metal or plastic). An upper tray component 136 is pivotally mounted on the lower tray component 135, and this arrangement serves as a laptop computer tray for supporting a laptop computer (not shown). The user secures the laptop computer on the upper tray component 136 by suitable means, using for example, a hook and loop fabric fastener such as that available under the trademark VELCRO.

The middle or second leaf 132 includes a pocket arrangement 120 for holding a pad of paper, and a pocket arrangement 121 for holding business cards. The second leaf 132 is adapted to be closed down over the first leaf 131 as depicted in FIG. 4. The upper or third leaf 133 is adapted to be closed down over the second leaf 132, and the lower or first leaf 131 is adapted to be moved from a closed position shown in FIG. 5 to an open position shown in FIG. 6. The open position exposes the interior 137 of an auxiliary box 137 on which the accessory 100 is installed. The open position also permits access to the interior of armrest structures of the type that have a compartment within.

Thus, the invention provides a vehicle accessory or valet in the form of a device that covers the armrest structure intermediate the driver and passenger to provide pockets for holding various personal items and a pad of paper. One embodiment includes a holder for a laptop computer, and an auxiliary box is provided to support the valet intermediate the left and right backseats. Although an exemplary embodiment has been shown and described, one of ordinary skill in the art may make many changes, modifications, and substitutions without necessarily departing from the spirit and scope of the invention.

I claim:

1. An accessory for an automobile having a driver seat, a passenger seat adjacent to the driver seat, and an armrest structure intermediate the driver seat and the passenger seat, the accessory comprising:

a device having a size and shape adapted to rest atop and cover the armrest structure;

a top portion of the device, the top portion having a size and shape adapted to rest atop the armrest structure and hold a pad of paper;

a side portion of the device, the side portion having a size and shape adapted to extend downwardly from the top portion alongside the armrest structure; and at least one upwardly opening pocket arrangement on the side portion for holding an article;

wherein the top portion of the device includes a first leaf adapted to hold a laptop computer tray, a second leaf adapted to cover the laptop computer tray and hold the pad of paper, and a third leaf adapted to cover the pad of paper.

2. An accessory as recited in claim 1, further comprising a plurality of upwardly opening pockets on the side portion that are adapted to hold at least one beverage container, a pair of eye glasses, a mobile telephone, a pencil, a pen, a tape recorder, a calculator, a camera, and a wallet.

3. An accessory as recited in claim 1, further comprising means for holding business cards on the top portion, including a forwardly opening card-holding pocket arrangement on the top portion.

4. An accessory as recited in claim 1, wherein the cover is at least partially fabricated from a pliable material selected from the group consisting of cloth fabric, leather, and synthetic leather.

5. An accessory as recited in claim 1, further comprising an auxiliary box adapted to hold the device in the place of the armrest structure.

6. An accessory as recited in claim 5, wherein the box is insulated to enable it to function as a cooler in addition to holding the device.

7. An accessory for an automobile having a driver seat, a passenger seat adjacent to the driver seat, and an armrest structure intermediate the driver seat and the passenger seat, the accessory comprising:

a device having a size and shape adapted to rest atop and cover the armrest structure;

a top portion of the device, the top portion having a size and shape adapted to rest atop the armrest structure and hold a pad of paper;

a side portion of the device, the side portion having a size and shape adapted to extend downwardly from the top portion alongside the armrest structure; and at least one upwardly opening pocket arrangement on the side portion for holding an article;

wherein the top portion includes a padded panel covered with a pliable material and a first leaf adapted to hold a laptop computer tray; and wherein the laptop computer tray includes a first tray component that is adapted to fit within a forwardly opening pocket on the first leaf, and the tray includes a second tray component attached pivotally to the first tray component that is adapted to hold the laptop computer.

* * * * *